US009268560B2

(12) United States Patent
Mowatt et al.

(10) Patent No.: US 9,268,560 B2
(45) Date of Patent: Feb. 23, 2016

(54) DISPLAYING DEPENDENT FILES FOR COMPUTER CODE IN A TABBED-APPLICATION USER INTERFACE

(75) Inventors: Anthony C. Mowatt, Emeryville, CA (US); Valerio Virgillito, San Mateo, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 86 days.

(21) Appl. No.: 13/600,300

(22) Filed: Aug. 31, 2012

(65) Prior Publication Data

US 2014/0068558 A1    Mar. 6, 2014

(51) Int. Cl.
*G06F 9/44* (2006.01)
*G06F 17/21* (2006.01)

(52) U.S. Cl.
CPC ............... *G06F 8/71* (2013.01); *G06F 17/211* (2013.01)

(58) Field of Classification Search
USPC ........................................................ 717/120
See application file for complete search history.

(56) References Cited

U.S. PATENT DOCUMENTS

| 3,711,863 | A * | 1/1973 | Bloom | 714/38.1 |
| 7,757,212 | B2 * | 7/2010 | Wagner et al. | 717/120 |
| 8,037,470 | B2 * | 10/2011 | Huber | 717/170 |
| 2005/0222968 | A1 * | 10/2005 | Wayman | 707/1 |
| 2006/0015850 | A1 * | 1/2006 | Poole | 717/120 |
| 2007/0245323 | A1 * | 10/2007 | Bertelrud | 717/140 |
| 2008/0028366 | A1 * | 1/2008 | Weng et al. | 717/106 |
| 2008/0163187 | A1 * | 7/2008 | Loff | 717/168 |
| 2009/0319910 | A1 * | 12/2009 | Escapa et al. | 715/751 |
| 2010/0162104 | A1 | 6/2010 | Acker et al. | |
| 2011/0239207 | A1 * | 9/2011 | Wayman | 717/168 |
| 2011/0271224 | A1 | 11/2011 | Cruz Moreno et al. | |
| 2012/0036497 | A1 * | 2/2012 | Karthik et al. | 717/122 |
| 2012/0210298 | A1 * | 8/2012 | Hodgins et al. | 717/113 |
| 2013/0007709 | A1 * | 1/2013 | Fan et al. | 717/121 |
| 2013/0185701 | A1 * | 7/2013 | Martick | 717/120 |
| 2014/0019935 | A1 * | 1/2014 | Bouz et al. | 717/110 |
| 2014/0165036 | A1 * | 6/2014 | Aikens et al. | 717/121 |

OTHER PUBLICATIONS

Adobe, "Adobe Dreamweaver CS6" Aug. 24, 2012, 3 pages, http://www.adobe.com/products/dreamweaver.html.
Adobe Labs, Adobe Edge Animate Preview, "Motion and Interaction Design for HTML5", Aug. 24, 2012, 2 pages, http://labs.adobe.com/technologies/edge/.
Sencha; "Sencha Architect", Aug. 24, 2012, 2 pages, http://www.sencha.com/.

* cited by examiner

*Primary Examiner* — John Chavis
(74) *Attorney, Agent, or Firm* — Ropes & Gray LLP

(57) ABSTRACT

A method for indicating a change to a dependent file includes receiving a change to a program file. The method further includes displaying, via a computing device, a first identifier for a first dependent file in a first text style, if the first dependent file is changed based on the change to the program file. The method further includes displaying, via the computing device, a second identifier, in a second text style, for a second dependent file. The program file is dependent on the first and the second dependent files. The first text style indicates the first dependent file has been changed based on the change to the program file. The first text style and the second text style are different styles.

20 Claims, 4 Drawing Sheets

DISPLAYING DEPENDENT FILES FOR COMPUTER CODE IN A TABBED-APPLICATION USER INTERFACE

BACKGROUND

Computer programs include program files and dependent program files where the program files are dependent on the dependent program files. The program files include primary code for the computer program and the dependent program files include dependent code and/or dependent data that is used by the primary code. Changes to the primary code may require that changes be made to the dependent code and/or the dependent data. Various programs used for program development change the dependent code based on the change to the primary code.

A user may not be aware of the changes that are made to the dependent code and/or the dependent data when the primary code is changed. Further, a user may not be aware of the specific dependent program files that are changed when dependent code and/or dependent data are changed.

Also, when changes are made to the dependent program files based on the changes to the program file, the changes to the dependent program files may be committed to computer memory without the user being aware that the changes were committed to memory. In some cases, a user may not want to commit the changes in the dependent program files to computer memory. However, the user cannot prevent the changes being committed if the user is unaware of the changes being made. Also, a user may reverse the changes. However, the user needs to determine the specific dependent program files that are changed, which may be relatively time consuming especially if the number of dependent program files is large.

DETAILED DESCRIPTION

Described herein are techniques for displaying identifiers for dependent files with various styles to indicate changes to the dependent files where the changes are based on changes to a program file, which is dependent on the dependent files.

According to one embodiment, a method for indicating a change to a dependent file includes receiving a change to a program file, and displaying, via a computing device, a first identifier for a first dependent file in a first text style, if the first dependent file is changed based on the change to the program file. The method further includes displaying, via the computing device, a second identifier, in a second text style, for a second dependent file. Code of the program file is dependent on code or program data of the first and the second dependent files. The first text style indicates the first dependent file has been changed based on the change to the program file. The first text style and the second text style are different styles.

According to another embodiment, a method for indicating a change to a dependent file includes receiving a first change to a program file, and performing, via a computing device, a second change to a dependent file based on the first change to the program file. The program file is dependent on the dependent file. The method further includes displaying, via the computing device, a change indicator for the dependent file, wherein the change indicator indicates the second change to the dependent file.

According to another embodiment, a non-transitory computer-readable storage medium comprising instructions for indicating a change to a dependent file, wherein the instructions, when executed, are for controlling a computer system to be configured for: receiving a change to a program file; displaying a first identifier for a first dependent file in a first text style, if the first dependent file is changed based on the change to the program file; displaying a second identifier, in a second text style, for a second dependent file. The code of the program file is dependent on code or program data of the first and the second dependent files. The first text style indicates the first dependent file has been based on the change to the program file. The first text style and the second text style are different styles.

According to another embodiment, a non-transitory computer-readable storage medium comprising instructions for indicating a change to a dependent file, wherein the instructions, when executed, are for controlling a computer system to be configured for: receiving a first change to a program file; performing a second change to a dependent file based on the first change to the program file, wherein the program file is dependent on the dependent file; and displaying a change indicator for the dependent file, wherein the change indicator indicates the second change to the dependent file.

Figure 1:
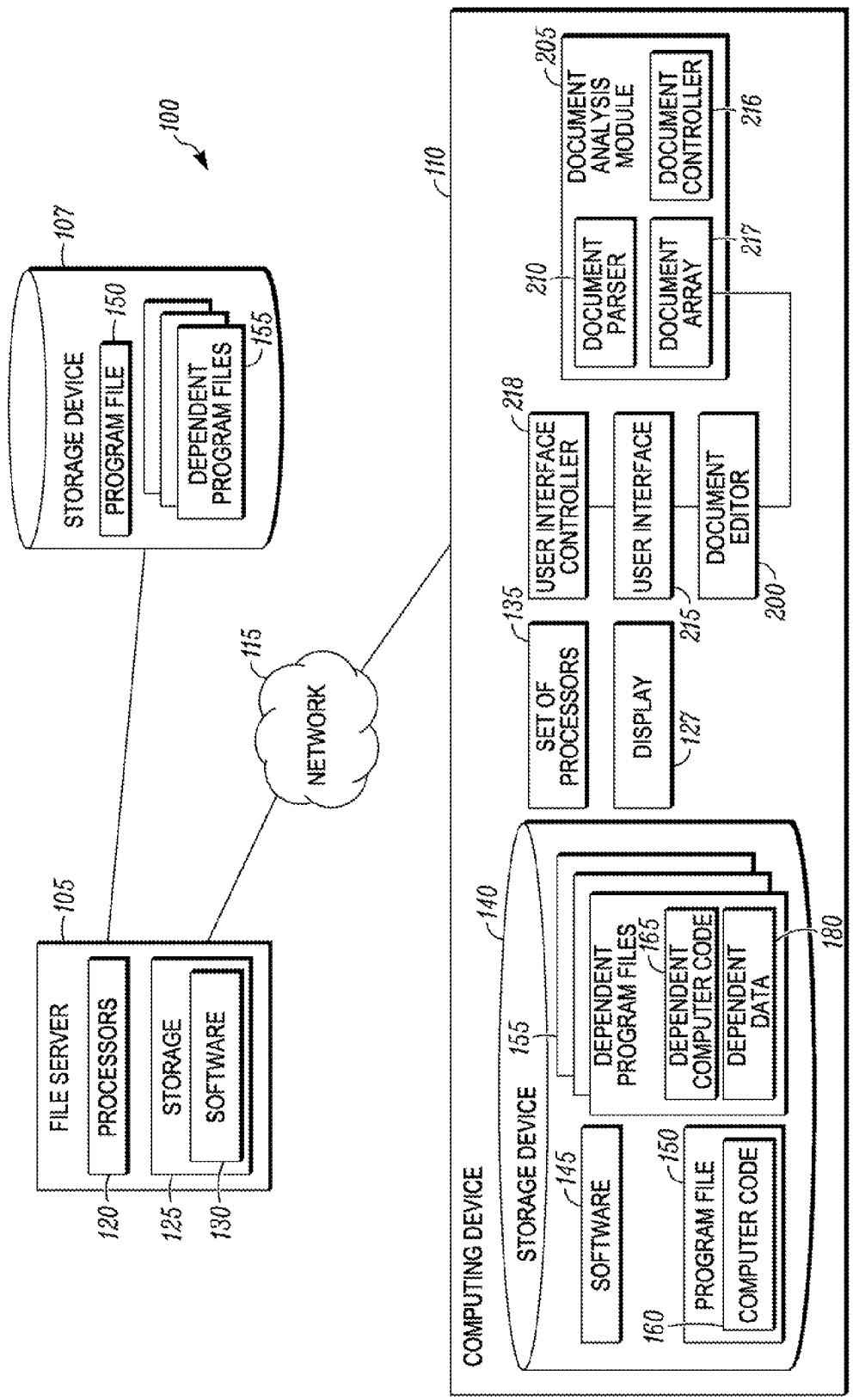
FIG. 1 depicts a computing system according to one embodiment.

FIG. 1 depicts a computing system 100 according to one embodiment. Computing system 100 includes a file server 105, a storage device 107, a computing device 110, and a network 115. File server 105 may be a computing device that operates a server operating system. File server 105 may include a set of processors 120 and a storage device 125. Storage device 125 may store software 130, which may be supplied from storage device 125 to the set of processors 120 for execution. Similarly, computing device 110 may include a set of processors 135, a storage device 140, and a display 127. Computing device 110 may include a variety of devices such as a desktop computer, a laptop computer, a tablet computer, etc. Storage device 140 may similarly store software 145, which may be supplied from storage device 140 to the set of processors 135 for execution. Storage devices 107, 125, and 140 may be non-transitory computer readable storage mediums. Network 115 may include a variety of networks, such as one or more intranets, the Internet, etc.

According to one embodiment, one or both of storage devices 107 and 140 store a program file 150 and a set of dependent program files 155. Computing device 110 may communicate with file server 105 via network 115 to store and retrieve program file 150 and dependent program files 155. If program file 150 and dependent program files 155 are stored in storage device 140, a local file I/O (input/output) system of computing device 110 may store and retrieve program file 150 and dependent program files 155 from storage device 140.

According to one embodiment, program file 150 may be dependent on dependent program files 155. Specifically, program file 150 may include primary computer code 160 where primary computer code 160 uses dependent computer code 165 and/or dependent data 180, which is included in one or more of dependent program files 155. Program files 150 may be nearly any type of program files that depend on dependent program files 155, such as C++ program files, HTML program files, XML program files, or the like. Primary computer code 160 in a program file 150 may be C++ code, HTML code, XML code, or the like.

Dependent computer code 165 may include functions, scripts, classes, or the like that are called by primary computer code 160 during execution, compiling, or both. Dependent data 180 may include information, such as settings, styles, tables, color information, or the like, which is called by primary computer code 160 during execution, compiling, or both. Dependent program files 155 may be script files, CSS (cascading style sheet) files, etc.

Computing device 110 may include a document editor 200 and a document analysis module 205. Document editor 200 may provide a coding environment used for developing program files 150 and dependent program files 155 according to one embodiment. The coding environment of document editor 200 may be displayed on a user interface 215 displayed on display 127. Document editor 200 may receive program file 150 from storage device 107 or 140 and display program file 150 on user interface 215.

According to one embodiment, document analysis module 205 includes a document parser 210 configured to parse program file 150 to determine the specific dependent program files 155 on which program file 150 depends. Document parser 210 may parse program file 150 when program file 150 is opened by document editor 200. According to some embodiments, document parser 210 may also parse dependent program files 155 to determine additional dependent program files 155 on which program file 150 may depend. Document parser 210 may generate a document array 217, which includes program identifiers (e.g., names) for the specific dependent program files 155 identified by the document parser. Document array 217 may be used by many software modules and hardware modules of computing device 110, such as a user interface controller 218 may use document array 217 for displaying the identifiers for dependent program files 155 on user interface 215.

According to one embodiment, document analysis module 205 includes a document controller 216 that tracks changes made to primary computer code 160 while primary computer code 160 is being edited in program file 150. Based on the changes to primary computer code 160, document analysis module 205 makes changes, as necessary, to dependent computer code 165 and/or dependent data 180 in one or more dependent program files 155. Document controller 216 may change one or more dependent program files 155 when a change is made to program file 150. More specifically, document analysis module 205 may change dependent computer code 165 and/or dependent data 180 in one or more dependent program files 155 based on changes to primary computer code 160 in program file 150. Document analysis module 205 may be configured to identify dependent program files 155 that are changed to user interface module 218 for display on user interface 215. Specifically, dependent program files 155 have dependent program identifiers 170 (e.g., names of dependent program files 155), and dependent program identifiers 170 are displayed in a first style for dependent program files 155 that are changed and are displayed in a second style for dependent program files 155 that are not changed. By displaying dependent program identifiers 170 in the first style for changed dependent program files and in the second style for non-changed dependent program files, a user may easily discern which dependent program files 155 have been changed based on the change to program file 150. The first and the second styles are described in further detail below.

Figure 2A:
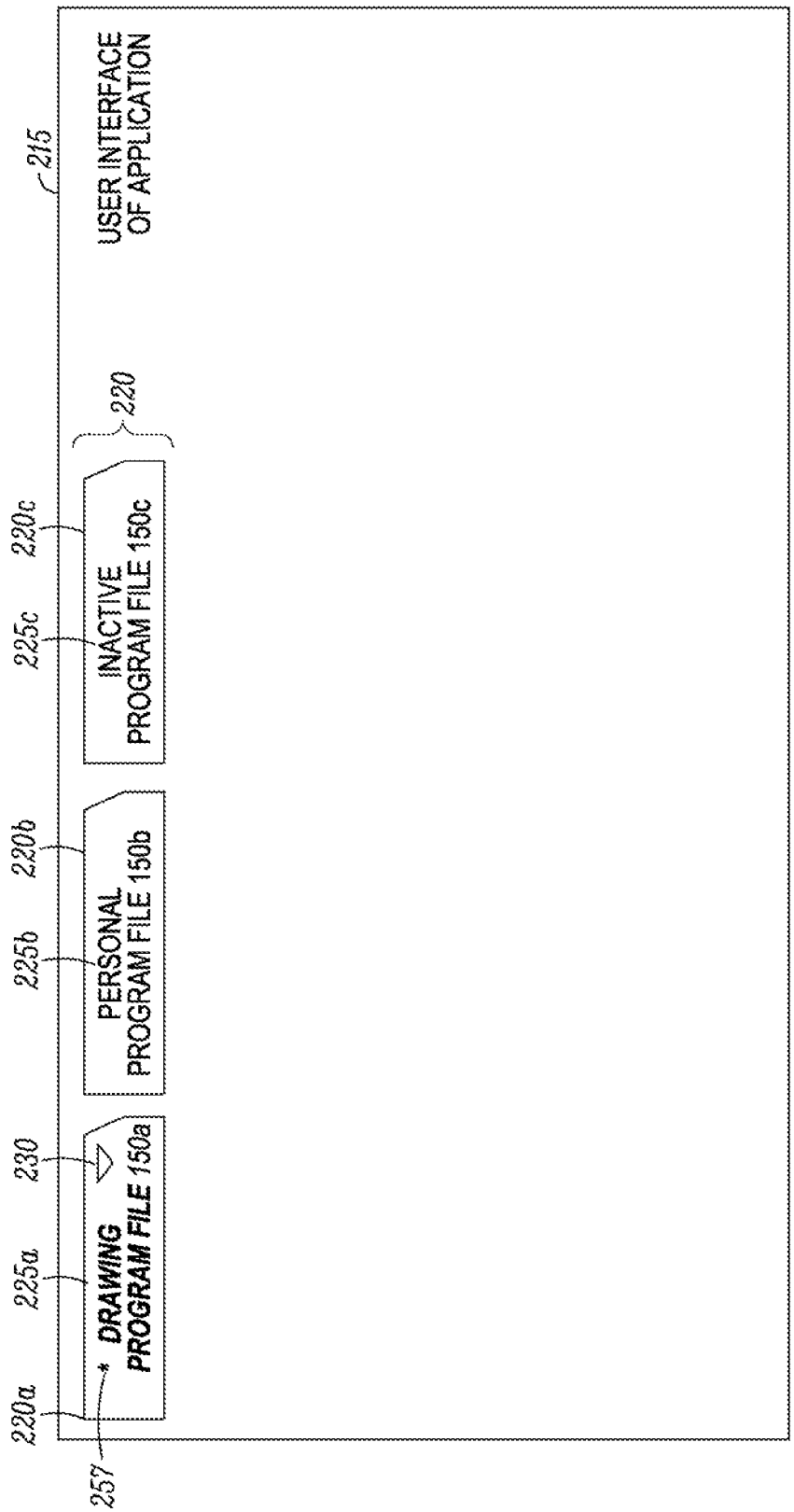
FIG. 2A depicts a user interface of a document editor according to an example embodiment.

FIG. 2A depicts user interface 215 of document editor 200 according to an example embodiment. User interface 215 includes one or more tabs 220 (sometimes referred to as headers) where the tabs include program identifiers 225 for program files 150. Program identifiers 225 may include the titles of specific program files 150 that are open in document editor 200. In example user interface 215 depicted in FIG. 2A, tabs 220 include a first program identifier 225a for a drawing program file 150a, a second program identifier 225b for a personal program file 150b, and an inactive program identifier 225c for an inactive program file 150c.

According to one embodiment, document editor 200 displays program identifiers 225 in tabs 220 in a first style for a first portion of program files 150 that are dependent on dependent program files 155. Document editor 200 may display program identifiers 225 in tabs 220 in a second style for a second portion of program files 150 that are not dependent on dependent program files 155. The first style may be a text style, such as bolded text, unique colored text, underlined text, italicized text, etc. The first style may include various icons displayed with (e.g., adjacent to) program identifiers 225, such as a drop-down icon 230 displayed with the program identifiers. Also, the first style is different from the second style to indicate the difference between program files 150 that are, and are not, dependent on dependent program files 155. The second style may be a text style, such as a plain text style that does not include characteristics of the first style, such as bolded text, underlined text, italicized text, text displayed with drop-down icon 230, etc.

In the example user interface 215 depicted in FIG. 2A, drawing program file 150a is displayed with drop-down icon 230 to indicate that drawing program file 150a is associated with dependent program files 155. Further, personal program file 150b and inactive program file 150c are not displayed with drop-down icons 230 to indicate that personal program file 150b and inactive program file 150c are not associated with dependent program files 155.

According to one embodiment, if a selected program file 150 is dependent on one or more dependent program files 150, which are changed by document controller 216 based on a change to the selected program file, the program identifier 225 for the selected program file 155 may be displayed with an change indicator 257 where the change indicator indicates that one or more dependent program files 155 associated with the selected program file 155 are changed. Change indicator 257 may be a non-alphabetic symbol, such as an asterisk as shown in FIG. 2A.

According to one embodiment, tabs 220 for program files 150, which are dependent on dependent program files 155, may be selected via a user selection to display program identifiers 225 for dependent program files 155 in user interface 215. Program identifiers 255 for dependent program files 155 may be displayed in a drop-down menu or the like. Tabs 220 may be user selected by a variety of techniques, such as mouse clicks, finger touches on display 127 if display 127 is a touch screen, mouse overs, etc.

Figure 2B:
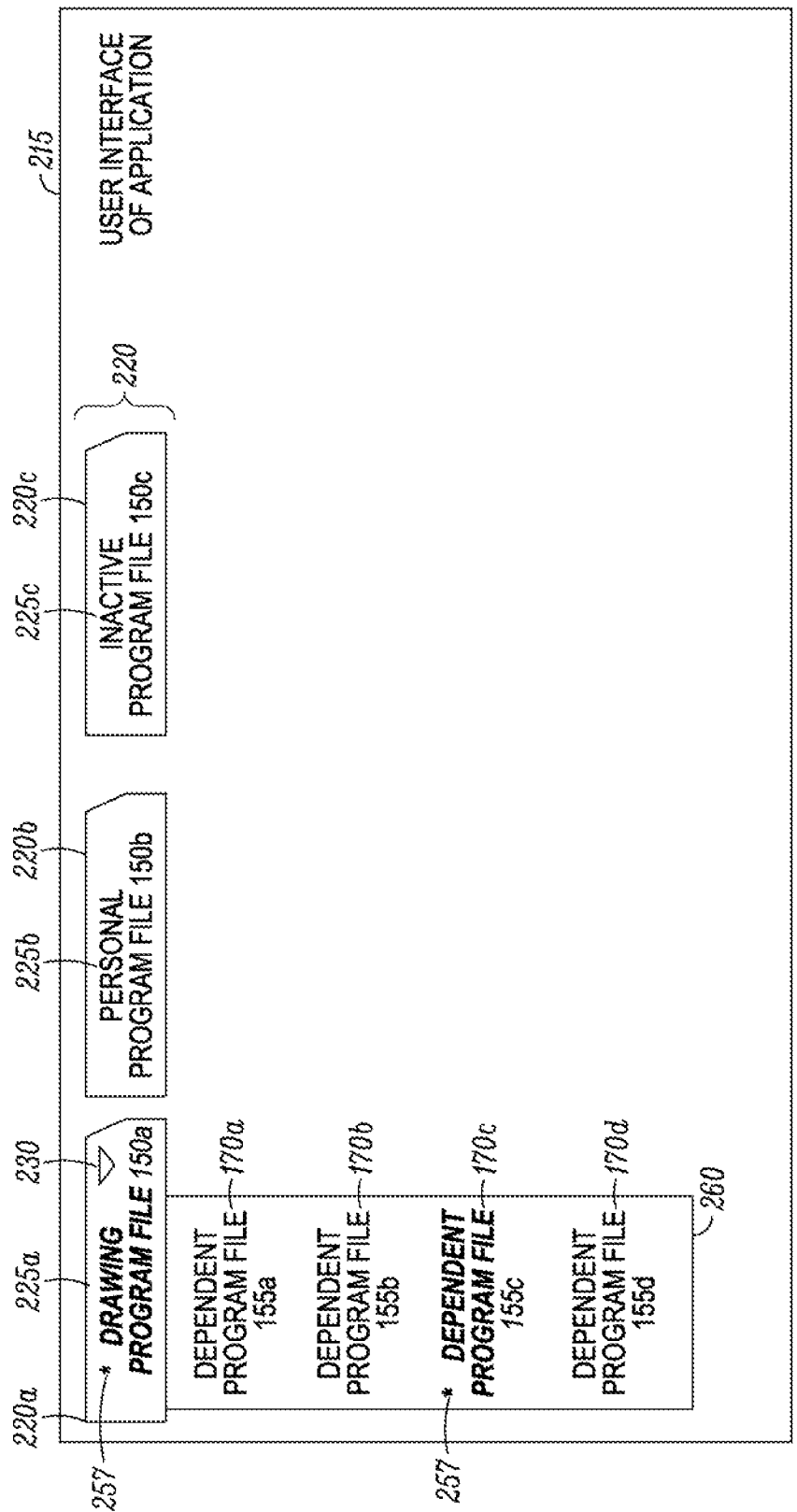
FIG. 2B depicts a drop-down menu that includes program identifiers for dependent program files according to an example embodiment.

FIG. 2B depicts a drop-down menu 260 that includes program identifiers 255 for dependent program files 155 according to an example embodiment. According to the example embodiment, dependent program files 155 depicted in FIG. 2B are associated with drawing program file 150a. Drop-down menu 260 may be displayed in response to tab 220a being selected via a user selection of tab 220a.

For a first portion of dependent program files 155 that are changed based on a change to program file 150, dependent program identifiers 170 for the first portion may be displayed in the first style. For a second portion of dependent program files 155 that are not changed based on the change to program file 150, dependent program identifiers 170 for the second portion may be displayed in the second style. As described above, the first style and the second style are different, and the first style indicates that the first portion of dependent program files 155 are changed, whereas the second style indicates that the second portion of dependent program files 155 are not changed based on the changes to program file 150. According to the example embodiment depicted in FIG. 2B, dependent program identifier 170c is displayed in the first styles (e.g., bolded and with an asterisk (e.g., a change indicator 257)) to indicate that dependent program identifier 170c is changed based on the change to program file 150, and dependent program identifiers 170a, 170b, and 170d are displayed in the second style (e.g., plain text) to indicate the dependent program files 155a, 155b, and 155d are not changed based on the change to program file 150a.

By displaying dependent program identifier 170c in the first style, and dependent program identifiers 170a, 170b, and 170d in the second style, a user may easily discern which dependent program files 155 have been changed based on the change to program file 150a. Further, since a list of dependent program identifiers 170 are displayed for program file 150a, a user does not need to search for the dependent program files 155 for program file 150a.

Figure 3:
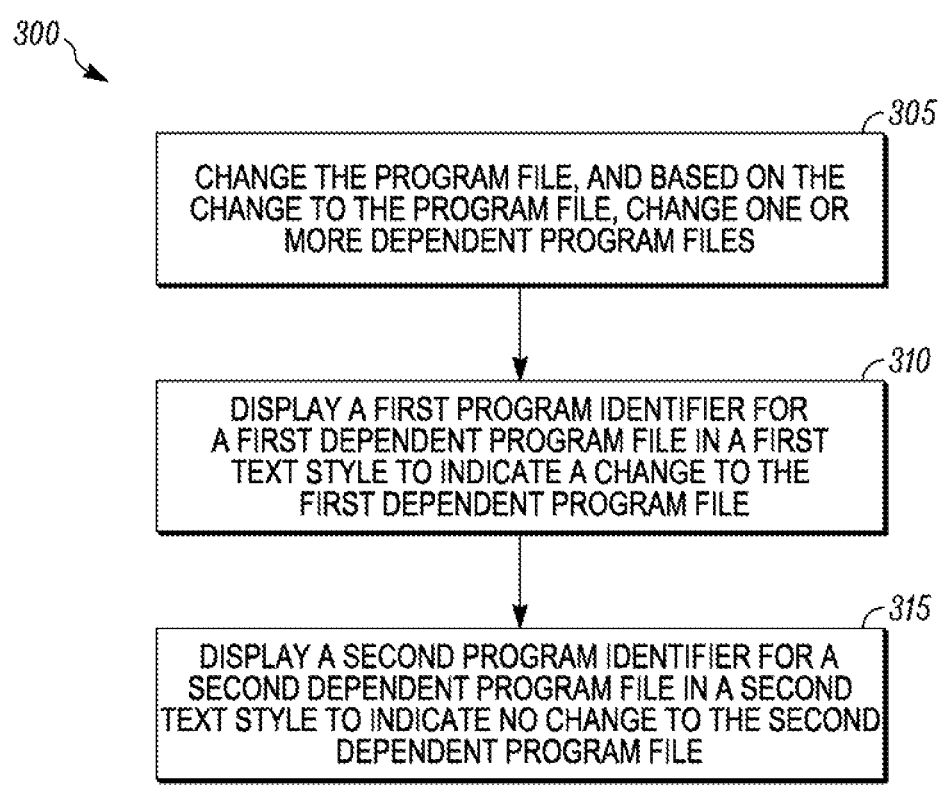
FIG. 3 depicts a high-level flow diagram of a method for indicating a change to one or more dependent program files where the change is based on a change to a program file, which is dependent on the dependent program files.

FIG. 3 depicts a high-level flow diagram of a method 300 for indicating a change to one or more dependent program files 155 where the change is based on a change to program file 150. The high-level flow diagram represents an example embodiment and those of skill in the art will understand that various steps of high-level flow diagram 300 may be combined and/or added without deviating from the scope and the purview of the embodiment.

At 305, document editor 200 receives a change to program file 150. The change may be to primary program code 160 of program file 150 as a user develops the primary program code. Document controller 216 may analyze the change and determine whether any changes should be made to one or more of dependent program files 155. Document controller 216 may change the one or more dependent program files 155 based on the analysis performed by the document analysis module.

At 310, user interface 215 displays a first dependent program identifier 170 in the first style for a first dependent program file 155 where program file 150 is dependent on first dependent program file 155. First dependent program identifier 170 is displayed in the first style if first dependent program file 155 is changed based on the change to program file 150 at 305.

At 315, user interface 215 displays a second dependent program identifier 170 in the second style for a second dependent program file 155. Program file 155 is also dependent on second dependent program file 155. The second identifier is displayed in the second style if second dependent program file 155 is not changed based on the change to program file 150. As described above, the first style and the second style are different styles, and the first style indicates the change to the first dependent file based on the change to the program file, and the second style indicates that the second dependent file is not changed based on the change to the program file. The display of the first and the second identifiers in the first and the second style provides that a user may be relatively quickly and clearly informed of dependent program files 155 that are changed by document controller 216 as program file 150 is edited and changed. The display of the first and the second program identifiers 255 in the first and the second styles further provides that a user does not have to analyze dependent program files 155 to determine which of dependent program files 155 is changed by document controller 216.

At 310 and 315, the first and the second program identifiers 255 may be displayed in drop-down menu 260 where drop down menu 260 may be displayed via a user selection of program identifier 255 for program file 150. According to one embodiment, dependent program identifiers 170 in drop-down menu 260 are user selectable menu items which may initiate dependent program files 155 being opened by document editor 200 in user interface 215 if the program identifiers are selected. According to one embodiment, document editor 200 may display a user prompt on user interface 215 to prompt the user to commit to memory changes made to dependent program files 155 by document controller 216. The user prompt may be displayed when the user initiates a save of program file 150, periodically, when dependent program files 155 are opened, when drop-down menu 260 is displayed, or the like As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments, along with examples of how aspects thereof may be implemented. The above examples and embodiments should not be deemed to be the only embodiments, and are presented to illustrate the flexibility and advantages of the teachings hereof. Based on the above disclosure and the following claims, other arrangements, embodiments, implementations, and equivalents may be employed without departing from the scope hereof, as defined by the claims.

We claim:

1. A method for indicating a change to a dependent file, the method comprising:
   receiving a first change to a program file;
   performing, via a computing device, a second change to code or program data in a first dependent file on the program file; wherein the second change is related to the first change; and
   displaying, in a document editor via the computing device, a first identifier for the first dependent file in a first text style, if the first dependent file is changed based on the first change to the program file;
   displaying, in the document editor via the computing device, a second identifier, in a second text style, for a second dependent file, if the second dependent file is not changed based on the first change to the program file wherein:
   code of the program file calls code or program data of the first dependent file and the second dependent file,
   the first text style indicates the first dependent file has been changed based on the first change to the program file, and
   the first text style and the second text style are different styles.

2. The method of claim 1, further comprising displaying a user prompt for saving the second change to the first dependent file in a non-transitory computer readable memory device.

3. The method of claim 2, further comprising:
   receiving, via the computing device, a response to the user query to save the first dependent file in the non-transitory computer readable memory device; and saving, via the computing device, the first dependent file in the non-transitory computer readable memory device based on the response.

4. The method of claim 1, wherein the second text style indicates the second dependent file is not changed based on the first change to the program file.

5. The method of claim 1, wherein the first identifier includes text that has the first text style and the second identifier includes text that has the second text style.

6. The method of claim 1, displaying a third identifier for the program file, where the third identifier identifies that the first dependent file is changed.

7. The method of claim 1, wherein the first identifier includes a non-alphabetic identifier that indicates the second change to the first dependent file based on the first change to the program file.

8. The method of claim 1 further comprising displaying a change indicator adjacent to the first identifier of the first dependent file, where the change indicator indicates the second change to the first dependent file has been performed.

9. A non-transitory computer-readable storage medium comprising instructions for indicating a change to a dependent file, wherein the instructions, when executed, are for controlling a computer system to be configured for:
receiving a first change to a program file;
performing, via a computing device, a second change to code or program data in a first dependent file on the program file on the program file; wherein the second change is related to the first change; and
displaying in a document editor a first identifier for the first dependent file in a first text style, if the first dependent file is changed based on the first change to the program file;
displaying in the document editor a second identifier, in a second text style, for a second dependent file, wherein:
code of the program file calls code or program data of the first dependent file and the second dependent file,
the first text style indicates the first dependent file has been changed based on the first change to the program file, and
the first text style and the second text style are different styles.

10. The non-transitory computer-readable storage medium of claim 9, wherein the instructions are for further controlling a computer system to be configured for displaying a user prompt for saving the second change to the first dependent file in a non-transitory computer readable memory device.

11. The non-transitory computer-readable storage medium of claim 10 wherein the computer system is further configured for:
receiving a response to the user query to save the first dependent file in the non-transitory computer readable memory device; and
saving the first dependent file in the non-transitory computer readable memory device based on the response.

12. The non-transitory computer-readable storage medium of claim 9, wherein the first identifier includes text that has the first text style and the second identifier includes text that has the second text style.

13. The non-transitory computer-readable storage medium of claim 9, wherein the second text style indicates the second dependent file is not changed based on the first change to the program file.

14. The non-transitory computer-readable storage medium of claim 9, wherein the computer system is further configured for displaying a third identifier for the program file, where the third identifier identifies that the first dependent file is changed.

15. The non-transitory computer-readable storage medium of claim 9, wherein the first identifier includes a non-alphabetic identifier, which indicates the second change to the first dependent file based on the first change to the program file.

16. The non-transitory computer-readable storage medium of claim 9, wherein the a computer system is further configured for displaying the change indicator adjacent to the first identifier of the first dependent file, where the change indicator indicates the second change to the first dependent file has been performed.

17. The method of claim 1, wherein the first dependent file and the second dependent file are open in the document editor; and
wherein the first identifier and the second identifier are displayed on different tabs of the document editor.

18. The method of claim 1, further comprising a drop down icon as part of the first identifier, to indicate that the program file is associated with the first dependent file and the second dependent file.

19. The non-transitory computer-readable storage medium of claim 9, wherein the first dependent file and the second dependent file are open in the document editor; and
wherein the first identifier and the second identifier are displayed on different tabs of the document editor.

20. The non-transitory computer-readable storage medium of claim 9, wherein the computer system is further configured for displaying a drop down icon as part of the first identifier to indicate that the program file is associated with the first dependent file and the second dependent file.

* * * * *